United States Patent [19]

Ferrante

[11] Patent Number: 4,797,551
[45] Date of Patent: Jan. 10, 1989

[54] COMPACT LASER SCANNER OPTICAL SYSTEM

[75] Inventor: Ronald A. Ferrante, Senecaville, Ohio

[73] Assignee: NCR Corporation, Dayton, Ohio

[21] Appl. No.: 60,586

[22] Filed: Jun. 11, 1987

[51] Int. Cl.$^4$ ................................................. H01J 3/14
[52] U.S. Cl. .................................... 250/234; 250/568; 235/467
[58] Field of Search ............... 250/566, 568, 570, 234, 250/236; 235/461, 467, 470

[56] References Cited

U.S. PATENT DOCUMENTS

| | | | |
|---|---|---|---|
| 3,787,107 | 1/1974 | Sick et al. | 250/566 |
| 4,018,504 | 4/1977 | Wu et al. | 250/236 |
| 4,093,865 | 6/1978 | Nickl | 250/566 |
| 4,097,729 | 6/1978 | Seligman et al. | 235/467 |
| 4,560,862 | 12/1985 | Eastman et al. | 235/467 |
| 4,652,732 | 3/1987 | Nickl | 235/462 |
| 4,713,532 | 12/1987 | Knowles | 235/467 |

Primary Examiner—Edward P. Westin
Assistant Examiner—Khaled Shami
Attorney, Agent, or Firm—Wilbert Hawk, Jr.; Albert L. Sessler, Jr.; Richard W. Lavin

[57] ABSTRACT

A compact optical scanning system comprises a portable enclosure structure having a cover portion which includes a glass enclosed aperture over which a UPC label attached to a purchased merchandise item is moved. Mounted within the enclosure below the cover portion is a laser whose output coherent light beam is reflected along a path extending in a direction parallel to the cover portion by mirrors mounted on a shelf extending between opposite side walls of enclosure. The laser beam is directed through an aperture in a collection mirror to a bifocal lens which includes a second lens for focusing the received laser beam at the aperture by directing the laser beam at a mirror mounted so as to reflect the laser beam at a six-sided multi-faceted rotating mirrored spinner mounted on the floor of the enclosure directly beneath the shelf and the bifocal lens. The rotating mirrored spinner directs the laser beam at a plurality of pattern mirrors which redirect the received laser beam towards the aperture, forming a scanning pattern thereat for scanning the UPC label. The reflected light beams from the label are retro-directed via the pattern mirrors, the rotating mirrors, the deflecting mirror and the bifocal lens which focuses the reflected light beams at a photodetector through a collection mirror which filters out light having a waveform greater than the waveform of the laser beam to a colored meniscus lens mounted on the photodetector member. The meniscus lens filters out light from the laser beam having wavelengths which are less than the wavelength of the laser beam, resulting in the transmission of reflected light beams to the photodetector member having a band pass centered on the wavelength of the laser light beam.

12 Claims, 4 Drawing Sheets

COMPACT LASER SCANNER OPTICAL SYSTEM

BACKGROUND OF THE INVENTION

The present invention relates to optical scanning systems and more particularly to a compact portable optical bar code scanner system which can be mounted in or on a checkout counter in which the checkout operator is in a sitting position with respect to the checkout counter.

In present-day merchandising point-of-sale operations, data pertaining to the purchase of a merchandise item is obtained by reading data encoded indicia such as a bar code printed on the merchandise item. In order to standardize the bar codes used in various point-of-sale readout systems, the grocery industry had adopted a uniform product code (UPC) which is in the form of a bar code. Reading systems which have been constructed to read this bar code include hand-held wands which are moved across a label bearing the bar code and stationary optical scanners normally located within the cabinet structure of a checkout counter and in which the bar code label is read when a purchased merchandise item and its associated label are moved across a window in the supporting surface of the counter constituting the scanning area of a counter, which movement is part of the process of loading the item in a bag or baggage cart. There has arisen a need for a stationary optical scanner to be installed in a checkout counter in which the operator is required to be in a sitting position at the checkout counter having a table-height construction. In order to meet this requirement, the depth of the optical scanner is required to be very shallow which limits the length of travel of the scanning light beams generated by the optical scanner and therefore the number of scanning lines in the resulting scanning pattern projected to read the bar code label which in turn controls the scanning efficiency of the pattern and the scanner.

SUMMARY OF THE INVENTION

A compact optical scanner is provided which comprises a portable enclosure structure having a cover portion which includes a glass enclosed aperture over which a UPC label attached to a purchased merchandise item is moved. Mounted within the enclosure below the cover portion and extending in a direction parallel with the surface of the cover portion is a laser whose output light beam is deflected along a path extending in a direction parallel to the cover portion by mirrors mounted on a shelf extending between opposite side walls of the enclosure. The laser beam is directed through an aperture in a collection mirror to a bifocal lens which directs the laser beam at a mirror mounted so as to direct the laser beam at a six-sided multi-facet rotating mirrored spinner mounted to the floor of the enclosure directly beneath the shelf and the bifocal lens. The rotating mirrored spinner directs the laser beam at a plurality of pattern mirrors which redirect the received scanning light beams towards the aperture forming a scanning pattern thereat for scanning the UPC label. The reflected light beams from the label are retro-directed via the pattern mirrors, the rotating mirrors, the deflecting mirror, and the bifocal lens to one side of the collection mirror which is constructed to reflect light having a wavelength equal to or less than the light of the laser beam to a colored meniscus lens. The color of the meniscus lens is chosen to filter out wavelengths of light which are less than that of the laser light beam resulting in the transmission of reflected light beams having a band pass centered on the laser wavelength. A photodetector positioned behind the meniscus lens converts the received light beams to electrical signals which are processed by the scanner electronics.

It is therefore a principal object of this invention to provide a compact optical scanner which can be placed on or in the supporting structure of a checkout counter for processing merchandise items which are moved past the scanner by an operator who is sitting down at the checkout counter.

It is another object of this invention to provide a highly efficiency optical scanner having a structure whose length is greater than its depth.

It is a further object of this invention to provide a compact low-profile optical scanner which is low in cost.

BRIEF DESCRIPTION OF THE DRAWINGS

These and other objects, features and advantages of the invention, as well as the invention itself, become more apparent to those skilled in the art in the light of the following detailed description taken in consideration with the accompanying drawings wherein like reference numerals indicate like or corresponding parts throughout the several views and wherein.

DESCRIPTION OF THE PREFERRED EMBODIMENT

Figure 1:
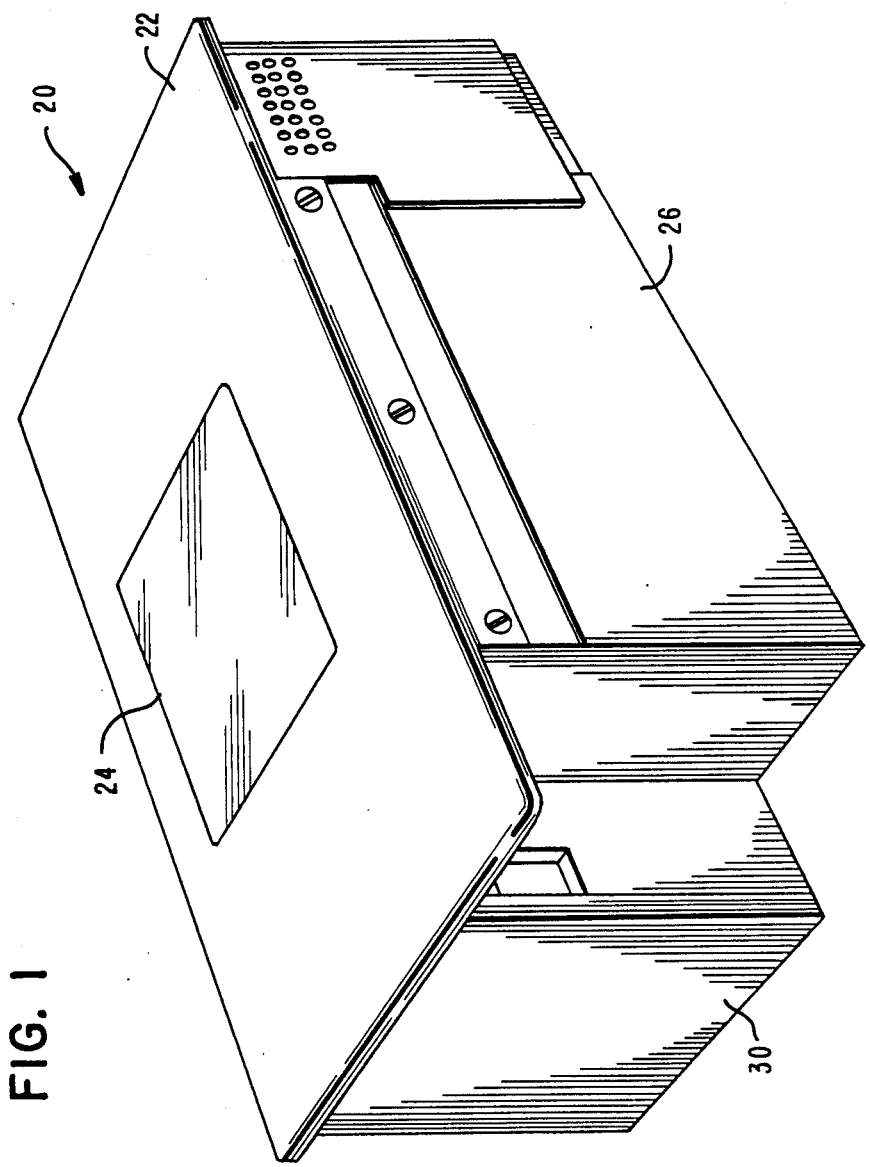
FIG. 1 is a perspective view of the compact optical scanner of the present invention.

Referring now to FIG. 1 there is shown a perspective view of the compact optical scanner of the present invention which comprises a box-like structure generally indicated by the numeral 20 and which includes a cover portion 22 having centrally located therein a glass covered aperture 24. The structure 20 further includes a pair of sidewall portions 26 and 28 (FIG. 2) and front and rear wall portions 30 an 32 (FIG. 2) having a maximum depth of 13 cm. The structure 20 is normally mounted within a checkout counter (not shown) whose supporting surface is coplanar with the surface of the cover portion 22 enabling a purchased merchandise item having a UPC coded label attached thereto to be moved past the aperture 24 as part of a checkout operation.

Figure 2:
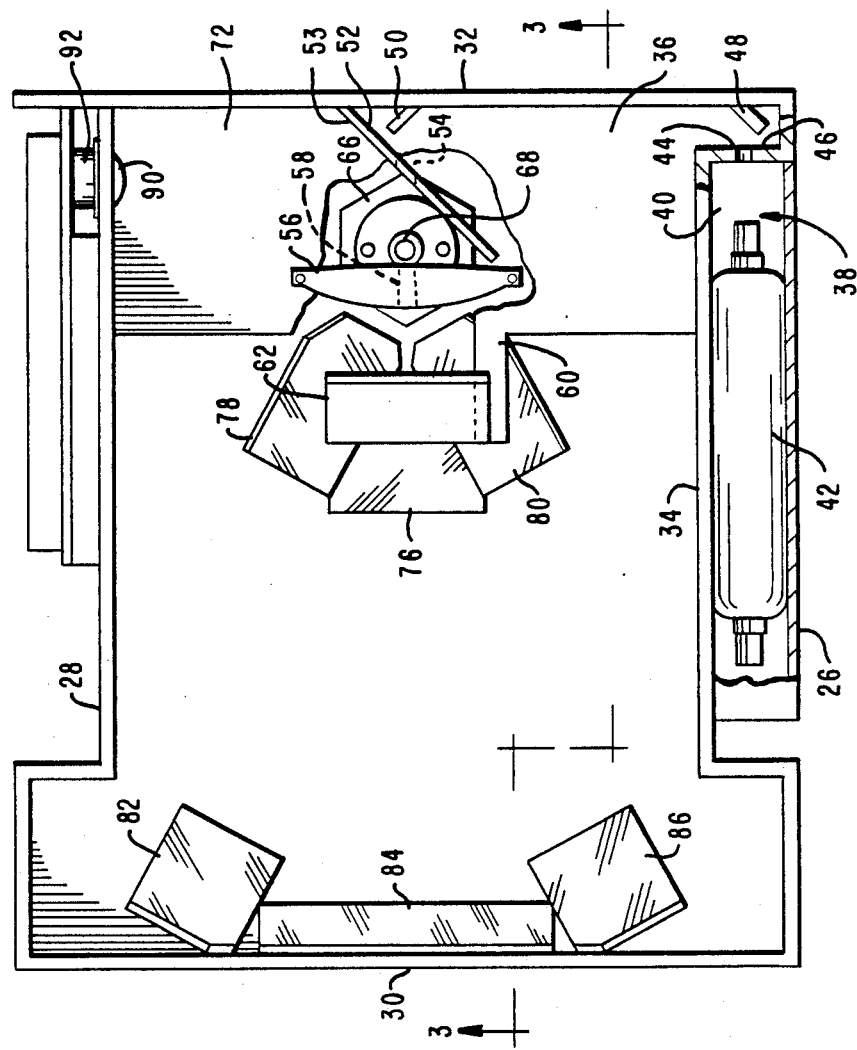
FIG. 2 is a top view of the compact scanner with the cover and a portion of the shelf removed showing the location of the rotating mirrored spinner member.
Figure 3:
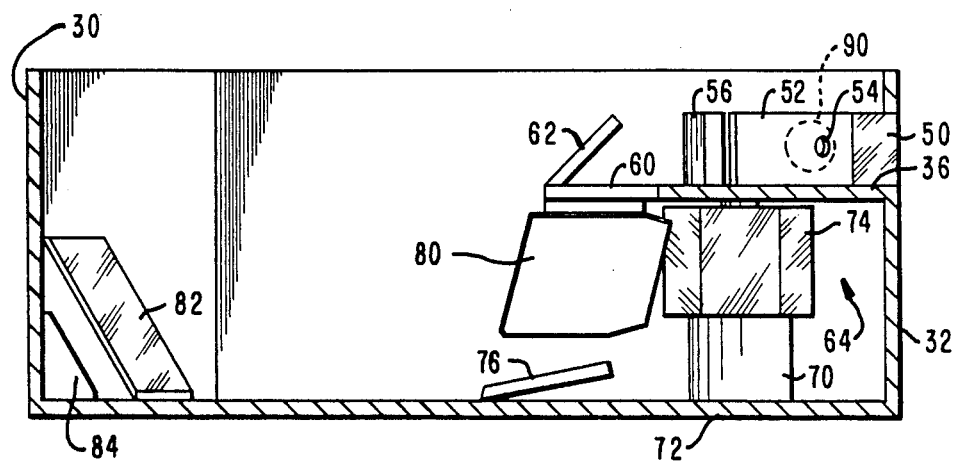
FIG. 3 is a sectional view taken on line 3—3 of FIG. 2.

Referring now to FIGS. 2 and 3, there are shown structural details of the optical scanner. Extending between the sidewall portion 28 and an inner sidewall portion 34 is a shelf member 36. The inner sidewall portion 34 and the sidewall portion 26 form a compartment generally indicated by the numeral 38 which includes a support member 40 co-planar with the shelf member 36 and on which is mounted a laser member 42 projecting a coherent light beam 94 (FIG. 4) through an aperture 44 located in a rear wall portion 46 of the compartment 38. Positioned adjacent the aperture 44 and mounted on the shelf member 36 is a routing mirror 48 positioned at a 45° angle to the centerline of the aperture 44. Also mounted on the shelf member 36 is a second routing mirror 50 positioned at a 45° angle to the rear wall portion 32.

Mounted on the shelf member 36 adjacent the routing mirror 50 and extending in a direction perpendicular to the orientation of the routing mirror 50 is a transparent collection mirror 52 which includes an aperture 54 extending through the mirror 52. The mirror 52 has one side 52 constructed to reflect light impinging thereon in a manner that is well known in the art. Mounted on the shelf member 36 and adjacent the collection mirror 52 is a bifocal lens member 56 which includes a lenslet portion 58. The bifocal lens member 56 is constructed to focus the light reflected from a scanned UPC coded label onto a photodetector 92 (FIGS. 2 and 4) while the lenslet portion 58 is constructed to focus the laser beam 94 (FIG. 4) onto the UPC coded label positions adjacent the aperture 24.

Mounted on a pair of flange portions 60 of the shelf member 36, one of which is shown in FIG. 2, is a routing mirror 62 extending in a 65° direction to the plane of the shelf member 36 (FIG. 3). As will be described hereinafter, the routing mirrors 48 and 50 will direct the output light beam of the laser member 42 through the aperture 54 in the collection mirror 52 and the lenslet portion 58 in the bifocal lens 56 to the routing mirror 62 which directs the light beam in a downwardly direction to a position beneath the shelf member 36 and the bifocal lens 56 where the beam impinges on a multi-faceted mirrored spinner generally indicated by the numeral 64. The spinner 64 comprises a support member 66 (FIG. 2) secured to a drive shaft 68 which in turn is rotatably mounted between the shelf member 36 and a drive motor 70 mounted on the floor member 72 of the enclosure structure 20. Secured to the support member 66 are six mirror elements 74 (FIG. 3) which are mounted at various angles to the vertical face of the support member in order to generate a multiple line scanning pattern as will be described more fully hereinafter. Two of the mirrors are mounted 90° to the top surface of the support member 66. Two of the mirrors 74 are pitched forward by 0.4 of a degree while the remaining two mirrors are pitched backward by 0.4 of a degree.

Mounted at an angle to the floor portion 72 is a center lower pattern mirror 76 while secured to the flanged portions 60 of the shelf member 36 are a right lower pattern mirror 78 and a left lower pattern mirror 80 (FIGS. 2 and 3). Located adjacent the front wall portion 30 of the structure 20 and mounted to the floor portion 72 are a right upper pattern mirror 82, a center upper pattern mirror 84 and a left upper pattern mirror 86. As shown in FIG. 3, the mirrors 82-86 inclusive are oriented at an angle with respect to the floor portion 72 to direct the scanning light beams received from the pattern mirrors 76-80 inclusive through the aperture 24 (FIG. 1) to form a scan pattern generally indicated by the numeral 88 (FIG. 5) which consists of three sets of three scan lines for scanning the UPC label positioned adjacent the aperture 24.

Located in the sidewall portion 28 (FIG. 2) of the enclosure structure 20 is a colored meniscus lens member 90 in which is positioned the photodetector 92 for converting the light beams received from the lens member 90 into electrical signals which are processed by the scanner electronics in a manner that is well known in the art. The color of the lens 90 is chosen to filter out wavelengths of light reflected from the UPC label which are less than that of the laser light beam, such as the blue and the green light band, resulting in the transmission of light beams to the photodetector 92 having a band pass centered on the wavelength of the laser light beam as will be described hereinafter. The collection mirror 52 is a spectrally selective "cold" mirror which reflects light having a wavelength equal to or less than that of the laser light beam outputted by the laser member 42. Side 53 of the mirror 52 is painted with a light absorbing material such as black aluminum which absorbs light having a wavelength greater than that of the laser light beam, such as the infrared band, while reflecting the remaining bands of reflected light.

Figure 5:
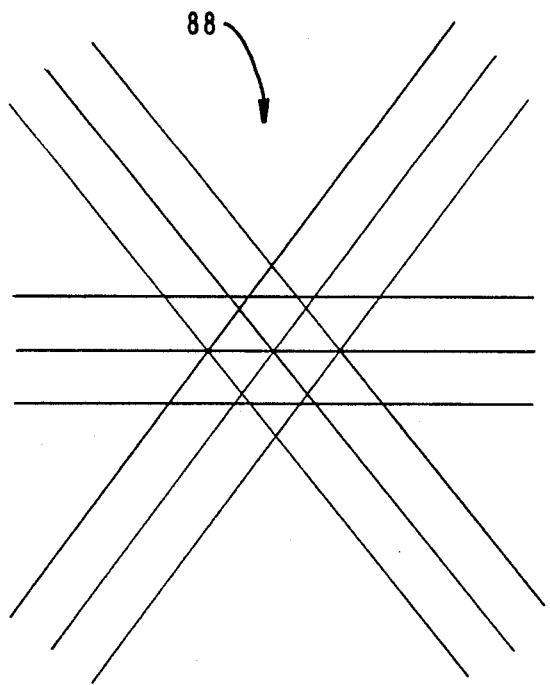
FIG. 5 is a plan view of the scanning pattern generated by the optical geometry of the present invention.
Figure 4:
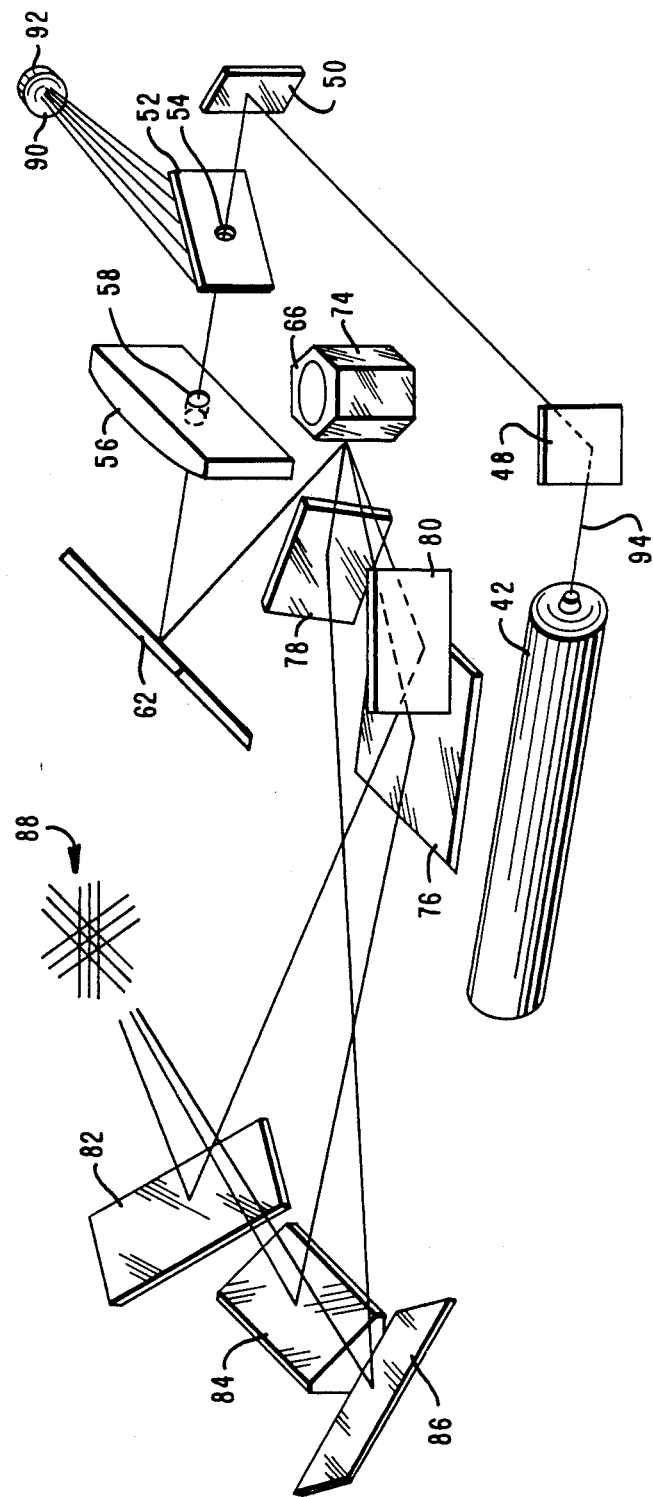
FIG. 4 is a perspective view of the optical geometry of the compact scanner of the present invention.

Referring to FIG. 4 there is shown a perspective view of the optical elements found in the enclosure structure 20 for directing the output light beam 94 of the laser member 42 in a direction to generate the scan pattern 88 (FIG. 5). The laser light beam 94 outputted from the laser tube 42 is routed via the routing mirrors 48 and 50 and through the aperture 54 in the collection mirror 52 to the lenslet portion 58 of the bifocal lens 56. The lenslet portion 58 will direct the light beam 94 at the mirror 62 which reflects the light beam at the rotating mirrored spinner 64. The light beam upon striking the mirrored spinner 64, will be directed to the lower pattern mirrors 76-80 inclusive. The mirror 78 will reflect the received light beam towards the left upper mirror 86 while the pattern mirror 80 will direct the received light beam at the right upper pattern mirror 82. The center lower pattern mirror 76 will direct the received light beam at the center upper pattern mirror 84. The resulting scanning pattern 88 that is generated by this mirror system comprises 3 sets of scan lines which cross, as shown in FIG. 5, to provide a highly efficient scanning pattern.

After striking the UPC label, the diverging reflected light beams are retro-directed through the upper pattern mirror 82, 84, or 86 and the lower pattern mirrors 76, 78 or 80, to the spinner 64 which directs the reflected light beams towards the routing mirror 62 from where the light beams are directed to the bifocal lens 56. The lens 56 will focus the received light beams at the photodetector 92 (FIG. 2) by directing the reflected light beam at the collection mirror 52 which reflects the received light beams toward the lens 90 from where the photodetector 92 will generate electrical signals for processing the data incorporated in the bar code label. Since the reflected light beams may contain sunlight, the mirror 52 and the lens 90 filter out all wavelengths of light except that of the laser light thus insuring that the light beams received by the photodetector 92 will enable the photodetector to generate electrical signals which accurately represent the data contained in the bar code label. It will thus be seen that there is disclosed an optical scanner which allows the checkout operation to occur on a checkout counter where the operator may be in a sitting position in a highly efficient manner.

Although the preferred embodiment of the present invention has been described herein, it is not intended that the invention be restricted thereto but that it be limited only by the true spirit and scope of the appended claims.

What is claimed is:

1. An optical scanning apparatus for reading bar code symbols on objects passing over the scanning apparatus comprising a housing structure which includes:
   a base member;

a cover member having an aperture therein through which scanning light beams are projected and past which aperture a merchandise item bearing a coded label is moved;

oppositely located first and second wall members;

a support member mounted between said first and second wall members intermediate said base and cover members;

a source of a coherent light beam secured to said first wall member above said support member for projecting the light beam along the top surface of said support member;

first and second light reflecting means mounted on the top surface of said support member for receiving said light beam and reflecting the light beam along a first light path;

light transmitting means mounted on said support member in said first light path and adjacent said second light reflecting means for transmitting the light beam along a second light path;

third reflecting means mounted on said support member in said second light path and at an acute angle to said support member for reflecting the light beam in a downward direction along a third light path in the same vertical plane as the second light path but in the opposite direction;

scanning means mounted on said base member below said support member and in said third light path for cyclically sweeping the light beam along a plurality of fourth light paths;

fourth reflecting means mounted in said fourth light paths and to the bottom surface of said support member for reflecting the light beam along a plurality of fifth light paths; and fifth reflecting means mounted in said fifth light path and on said base member adjacent the cover member for reflecting the light beam through said aperture in the cover member for scanning a bar code label positioned adjacent said aperture.

2. The scanning apparatus of claim 1 in which said light transmitting means includes a transparent member mounted on the top surface of said support member having a transparent surface including an aperture through which the light beam is transmitted along said second light path and a reflecting surface for reflecting the light beam reflected from the bar code label along a plurality of six light paths.

3. The scanning apparatus of claim 2 in which said light transmitting means further includes a first lens member mounted adjacent said transparent member and having a second lens member mounted therein for transmitting the light beam along said second light path, said first lens member directing the light beam reflected from the bar code label onto the reflecting surface of said transparent member.

4. The scanning apparatus of claim 3 in which said scanning means includes a multifaceted mirror member positioned between said base member and said support member below said first lens member and drive means mounted on said base member and rotatably supporting said multifaceted mirror member for rotating said multifaceted mirror member whereby said multifaceted mirror member reflects the light beam along said plurality of fourth light paths.

5. The scanning apparatus of claim 4 in which said housing structure further includes detector means mounted on said second wall member in said sixth light paths for generating electrical signals in response to receiving the reflected light beam from said transparent member.

6. The scanning apparatus of claim 5 in which said detecting means includes a third lens member for transmitting a light beam having a wavelength which is not less than the wavelength of the light beam emitted from said light emitting means.

7. The scanning apparatus of claim 6 in which the reflecting surface of said transparent member reflects a light beam having a wavelength which is not more than the wavelength of the light beam emitted from said light emitting means.

8. A compact optical scanning apparatus for reading bar code labels on merchandise items passing the scanning apparatus comprising a housing structure which includes;

front and rear wall members;

a floor member and a cover member having an aperture therein through which scanning light beams are projected and past which aperture a merchandise item bearing a coded label is moved;

oppositely located first and second side wall members;

a shelf member mounted between said side wall members intermediate said floor and said cover members, said shelf member extending out from said rear wall member a predetermined distance forming an opening within the housing structure and including a pair of flange portions extending outwardly into said opening;

a source for a coherent light beam secured to said first side wall member above said shelf member;

first and second mirror members mounted on the top surface of said shelf member for receiving said coherent light beam from said source and reflecting said coherent light beam along a first light path;

light transmitting means mounted on the top surface of said shelf member in said first light path for transmitting the light beam along a second light path;

a third mirror member mounted on the top surface of said flange portions at an angle to said second light path for deflecting the light beam in a downward direction along a third light path in the same vertical plane as the second light path but in the opposite direction;

a rotating multifaceted mirrored spinning member mounted in said third light path between the shelf member and the floor member for cyclically sweeping the received coherent light beam along a plurality of fourth light paths in a direction parallel to said floor member and towards said front wall member; and a plurality of fourth mirror members mounted on said shelf member and said floor member downstream from said spinning member in said plurality of fourth light paths for deflecting the light beams through said aperture in the cover member for scanning a bar code label positioned adjacent said aperture.

9. The scanning apparatus of claim 8 in which said light transmitting means includes a transparent member receiving the reflected light from said second mirror member and positioned in an angle to said second light path including an aperture positioned in said second light path through which said coherent light beam is transmitted along said second light path, said transparent member further including a reflecting surface for receiving light beams reflected form the bar code label for reflecting the received light beams along a plurality of fifth light paths, said reflecting surface further absorbing light beams in said received light beams whose wavelength is greater than that of the coherent light beam of said source.

10. The scanning apparatus of claim 9 in which said light transmitting means further includes a bifocal lens member mounted adjacent said transparent member for receiving the reflected light beams from the bar code label and having a second lens member mounted therein and positioned in the second light path for focusing the coherent light beam on a bar code label positioned adjacent said aperture.

11. The scanning apparatus of claim 10 in which said housing structure further includes a photodetector member mounted in said second side wall member and positioned in said plurality of fifth light paths for generating electrical signals in response to receiving the reflected light beams from the reflecting surface of said transparent member, said bifocal lens focusing the reflected light beams received from the bar code label on said photodetector member.

12. The scanning apparatus of claim 11 which further includes a third lens member mounted on said photodetector member for transmitting light beams to said photodetector member whose wavelengths are not less than that of the wavelength of the coherent light beam from said light source.

* * * * *

UNITED STATES PATENT AND TRADEMARK OFFICE
CERTIFICATE OF CORRECTION

PATENT NO. : 4,797,551

DATED : January 10, 1989

INVENTOR(S) : Ronald A. Ferrante

It is certified that error appears in the above-identified patent and that said Letters Patent is hereby corrected as shown below:

Column 6, line 64, delete "in" and substitute --at--.

Signed and Sealed this

Thirtieth Day of May, 1989

Attest:

DONALD J. QUIGG

Attesting Officer

Commissioner of Patents and Trademarks